United States Patent
Shibata et al.

(10) Patent No.: US 10,891,740 B2
(45) Date of Patent: Jan. 12, 2021

(54) MOVING OBJECT TRACKING APPARATUS, MOVING OBJECT TRACKING METHOD, AND COMPUTER PROGRAM PRODUCT

(71) Applicant: Kabushiki Kaisha Toshiba, Minato-ku (JP)

(72) Inventors: Tomoyuki Shibata, Kawasaki (JP); Yuto Yamaji, Kawasaki (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 76 days.

(21) Appl. No.: 15/897,275

(22) Filed: Feb. 15, 2018

(65) Prior Publication Data

US 2018/0342071 A1    Nov. 29, 2018

(30) Foreign Application Priority Data

May 29, 2017 (JP) ................................. 2017-105763

(51) Int. Cl.
*G06T 7/246* (2017.01)
*G06K 9/62* (2006.01)
*G06T 7/292* (2017.01)

(52) U.S. Cl.
CPC ............ *G06T 7/248* (2017.01); *G06K 9/628* (2013.01); *G06K 9/6269* (2013.01); *G06T 7/246* (2017.01);
(Continued)

(58) Field of Classification Search
CPC .................................. G06T 7/20; G06T 7/292
See application file for complete search history.

(56) References Cited

U.S. PATENT DOCUMENTS

| 9,191,633 | B2* | 11/2015 | Fujimatsu | ............ G06K 9/00771 |
| 2011/0087677 | A1* | 4/2011 | Yoshio | ............... G08B 13/19613 |
| | | | | 707/749 |

(Continued)

FOREIGN PATENT DOCUMENTS

| JP | 2006-146378 A | 6/2006 |
| JP | 5174068 | 4/2013 |

(Continued)

OTHER PUBLICATIONS

Cohen et al., "Associating Moving Objects Across Non-overlapping Cameras: A Query-by-Example Approach", 2008 IEEE Conference on Technologies for Homeland Security, May 12-13, 2008, pp. 566-571. (Year: 2008).*

(Continued)

*Primary Examiner* — Ping Y Hsieh
*Assistant Examiner* — Jose M Torres
(74) *Attorney, Agent, or Firm* — Oblon, McClelland, Maier & Neustadt, L.L.P.

(57) ABSTRACT

According to an embodiment, a moving object tracking apparatus includes an acquiring unit, an associating unit, and an output control unit. The acquiring unit is configured to acquire a plurality of pieces of moving object information representing a moving object included in a photographed image. The associating unit is configured to execute an associating process for associating a plurality of pieces of the moving object information similar to each other as the moving object information of the same moving object for three or more pieces of the moving object information. The output control unit is configured to output the associated moving object information.

6 Claims, 12 Drawing Sheets

(52) U.S. Cl.
CPC .... *G06T 7/292* (2017.01); *G06T 2207/10016* (2013.01); *G06T 2207/30196* (2013.01); *G06T 2207/30232* (2013.01); *G06T 2207/30241* (2013.01)

(56) References Cited

U.S. PATENT DOCUMENTS

| | | |
|---|---|---|
| 2011/0222785 A1 | 9/2011 | Hirohata et al. |
| 2015/0248587 A1 | 9/2015 | Oami et al. |
| 2016/0063731 A1* | 3/2016 | Yamamoto ............. H04N 7/181 348/159 |
| 2016/0217345 A1 | 7/2016 | Appel et al. |
| 2016/0284098 A1 | 9/2016 | Okumura et al. |
| 2017/0177287 A1* | 6/2017 | Jeong ..................... G06F 3/147 |
| 2018/0144074 A1 | 5/2018 | Yamaji et al. |
| 2018/0197018 A1 | 7/2018 | Nakasu et al. |

FOREIGN PATENT DOCUMENTS

| | | |
|---|---|---|
| JP | 2016-181743 | 10/2016 |
| JP | 2018-81654 A | 5/2018 |
| JP | 2018-112880 A | 7/2018 |
| WO | WO 2014/041912 A1 | 3/2014 |

OTHER PUBLICATIONS

Solera, F. et al. "Tracking Social Groups Within and Across Cameras" IEEE Transactions on Circuits and Systems for Video Technology, vol. 27, No. 3, 2017, pp. 441-453.

Joost Van De Weijer, et al., "Learning Color Names for Real-World Applications," IEEE Transactions on Image Processing, vol. 18, No. 7, Jul. 2009, pp. 1512-1523.

Tatsuo Kozakaya, et al., "Random Ensemble Metrics for Object Recognition," IEEE International Conference on Computer Vision, 2011, pp. 1959-1966.

* cited by examiner

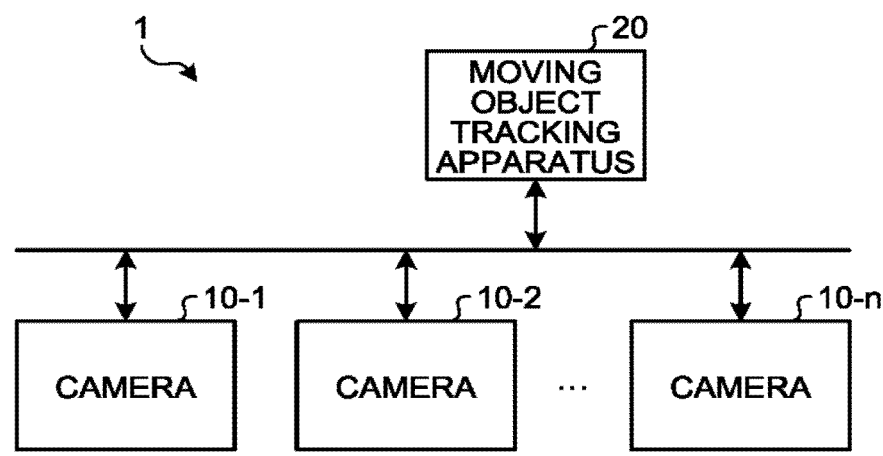
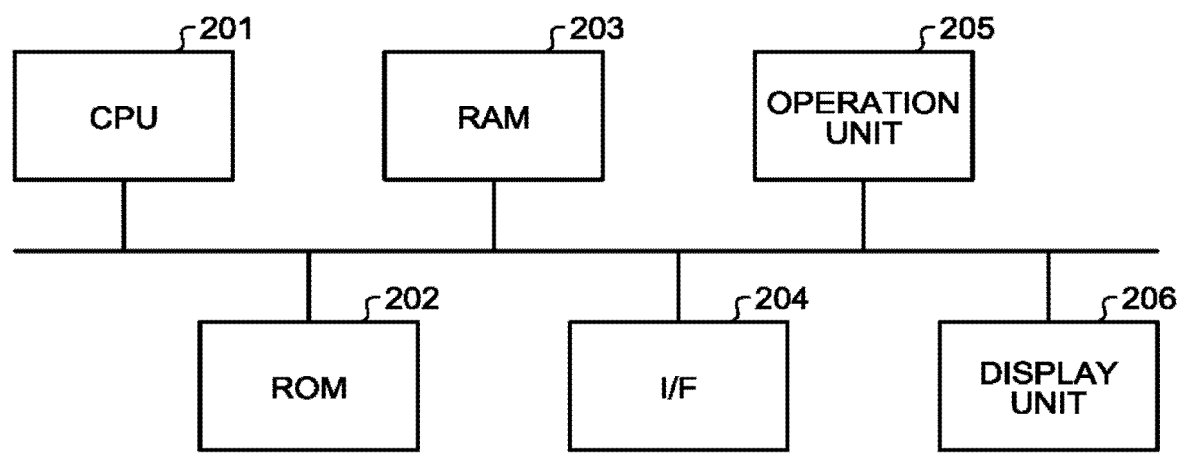

MOVING OBJECT TRACKING APPARATUS, MOVING OBJECT TRACKING METHOD, AND COMPUTER PROGRAM PRODUCT

CROSS-REFERENCE TO RELATED APPLICATIONS

This application is based upon and claims the benefit of priority from Japanese Patent Application No. 2017-195763, filed on May 29, 2017; the entire contents of which are incorporated herein by reference.

FIELD

Embodiments described herein relate generally to a moving object tracking apparatus, a moving object tracking method, and a computer program product.

BACKGROUND

In monitoring using images (videos) photographed by two or more cameras (imaging units), a method of obtaining a movement locus of each moving object within a monitoring range by associating the same moving object between cameras is known in the art. For example, a technique of obtaining a movement locus by repeatedly associating the same moving object between a pair of cameras has been proposed.

However, the association may partially fail. For this reason, in the related art, an association result is different depending on a combination of cameras used in the association and a sequence of the association, and an error of the association propagated. Therefore, it is difficult to obtain an optimum association result in some cases.

BRIEF DESCRIPTION OF THE DRAWINGS

FIG. 1 is a schematic block diagram illustrating a moving object tracking system according to a first embodiment;

FIG. 2 is a hardware block diagram illustrating a moving object tracking apparatus;

DETAILED DESCRIPTION

Figure 3:
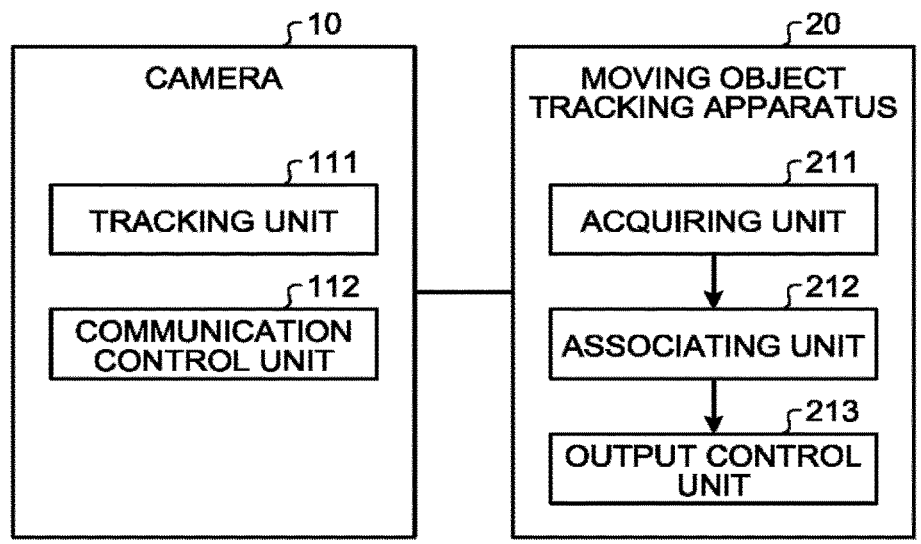
FIG. 3 is a functional block diagram illustrating the apparatus according to the first embodiment.

According to an embodiment, a moving object tracking apparatus includes an acquiring unit, an associating unit, and an output control unit. The acquiring unit is configured to acquire a plurality of pieces of moving object information representing a moving object included in a photographed image. The associating unit is configured to execute an associating process for associating a plurality of pieces of the moving object information similar to each other as the moving object information of the same moving object for three or more pieces of the moving object information. The output control unit is configured to output the associated moving object information.

Preferable embodiments of a moving object tracking apparatus according to an embodiment will now be described with reference to the accompanying drawings.

First Embodiment

As described above, in the related art, a result of association is different depending on a sequence of association between cameras or the like, and it is difficult to obtain an optimum association result in some cases. In addition, when the number of cameras increases, it is difficult to obtain the association result with realistic accuracy in some cases. Furthermore, it was necessary to perform the associating process by (number of cameras—1) times.

A moving object tracking apparatus according to the first embodiment executes optimum association of the same moving object as a whole by collectively processing information on each moving object (such as a person) obtained from a video photographed from each camera. As a result, it is possible to obtain information on a movement locus of a moving object or the like with higher accuracy.

The moving object tracking apparatus according to this embodiment is applicable to a system for obtaining movement locus of each person in a facility, for example, using a plurality of security cameras.

FIG. 1 is a diagram illustrating an exemplary schematic configuration of a moving object tracking system 1 according to this embodiment. As illustrated in FIG. 1, the moving object tracking system 1 includes "n" cameras 10-1 to 10-n (where "n" denotes an integer equal to or greater than 3) serving as an imaging unit and a moving object tracking apparatus 20. In the following description, when the "n" cameras 10-1 to 10-n are described without being distinguished from each other, they will be simply referred to as a "camera 10". Each camera 10 and the moving object tracking apparatus 20 are connected to each other in a wireless or wired manner.

FIG. 2 is a diagram illustrating an exemplary hardware configuration of the moving object tracking apparatus 20. As illustrated in FIG. 2, the moving object tracking apparatus 20 includes a central processing unit (CPU) 201, a read only memory (ROM) 202, a random access memory (RAM) 203, an interface (I/F) 204, an operation unit 205, and a display unit 206.

The CPU 201 comprehensively controls operations of the moving object tracking apparatus 20. The CPU 201 executes various control programs recorded in the ROM 202 by using a predetermined area of the RAM 203 as a work area to implement various functions provided in the moving object tracking apparatus 20. The functions of the moving object tracking apparatus 20 will be described below in more details.

The ROM 202 is a nonvolatile memory (unrewritable memory) that stores a program or various types of setting information relating to the moving object tracking apparatus 20.

The RAM 203 is a storage unit such as a synchronous dynamic random access memory (SDRAM) serving as a work area of the CPU 201, a buffer, and the like.

The I/F 204 is an interface for connection to external devices such as the camera 10. The operation unit 205 is a device for receiving an operation from a user, such as a mouse or a keyboard. The display unit 206 is a device for displaying various types of information relating to the moving object tracking apparatus 20 and is, for example, liquid crystal display or the like. Note that the operation unit 205 and the display unit 206 may be integrated into a single body (for example, a touch panel).

The moving object tracking apparatus 20 may be physically a single apparatus or may be a virtual device under a cloud computing environment.

FIG. 3 is a block diagram illustrating exemplary functional configurations of the camera 10 and the moving object tracking apparatus 20 according to the first embodiment. As illustrated in FIG. 3, the camera 10 has a tracking unit 111 and a communication control unit 112. The moving object tracking apparatus 20 has an acquiring unit 211, an associating unit 212, and an output control unit 213. Note that, although FIG. 3 is illustrated by focusing on functions according to this embodiment, the functions of the camera 10 and the moving object tracking apparatus 20 are not limited thereto.

Each unit (including the acquiring unit 211, the associating unit 212, and the output control unit of the moving object tracking apparatus 20 is implemented, for example, by a single or a plurality of processors. For example, each unit may be implemented by executing a program using a processor such as the CPU 201, that is, as software. Each unit may be implemented by a processor such as a dedicated integrated circuit (IC), that is, as hardware. Each unit may be implemented by software and hardware in combination. When a plurality of processors are employed, each processor may implement either one of the units or two or more units.

Similarly, each unit (including the tracking unit 111 and the communication control unit 112) of the camera 10 is also implemented, for example, by a single or a plurality of processors.

The tracking unit 111 traces a moving object based n a photographed image group. For example, the tracking unit 111 obtains an image group photographed by the camera 10. The tracking unit ill detects a moving object as a detection target from the obtained image group and performs a tracking process for associating the same moving object out of the moving objects detected from each image. The tracking unit 111 outputs tracking information of each moving object in the camera 10.

The moving object is, for example, a person such as a pedestrian, but not limited thereto. The moving object may be an arbitrary moving object such as a vehicle and a flying object. In addition, the tracking information includes a position on an image plane, a size on the image plane, identification information for identifying the same moving object between images, a partial image group obtained by cutting a bounding rectangle of the moving object on the image, and the like.

According to this embodiment, the tracking information corresponds to moving object information representing a moving object included in the image. That is, the moving object information is tracking information representing information obtained by tracing the moving object included in a plurality of images.

The communication control unit 112 controls communication with external devices such as the moving object tracking apparatus 20. For example, the communication control unit 112 transmits the tracking information obtained by the tracking unit 111 to the moving object tracking apparatus 20.

The acquiring unit 211 acquires various types of information from the external devices such as the camera 10. For example, the acquiring unit 211 acquires the tracking information transmitted from the communication control unit 112 of the camera 10. The acquiring unit 211 acquires the tracking information obtained by the tracking unit 111 of each camera 10 from each of the plurality of cameras 10. Therefore, a plurality of pieces of tracking information acquired by the acquiring unit 211 include tracking information (first tracking information) obtained based on the image photographed by a certain camera 10 (first imaging unit) of a plurality of cameras 10 and tracking information (second tracking information) obtained based on the image photographed by the other camera 10 (second imaging unit) of the plurality of cameras 10.

Note that the function of the tracking unit 111 may also be provided in the moving object tracking apparatus 20. In this case, the communication control unit 112 transmits the photographed image group to the moving object tracking apparatus 20. In addition, the acquiring unit 211 acquires the tracking information obtained by the function of the tracking unit 111 in the moving object tracking apparatus 20 based on the transmitted image group.

The associating unit 212 executes an associating process for associating the moving object information (tracking information). The associating process is, for example, a process of associating a plurality of pieces of moving object information similar to each other as the moving object information of the same moving object. According to this embodiment, the associating unit 212 collectively executes the associating process for three or more pieces of moving object information. For example, the associating unit 212 classifies three or more pieces of moving object information into a plurality of clusters based on a degree of similarity and associates the moving object information classified into the same cluster as the moving object information of the same moving object.

The associating unit 212 collectively associates the moving object having similar tracking information with the same moving object using the tracking information obtained from all of the cameras 10. In the association, for example, a scale (degree of similarity) based on similarity of appearance of each moving object is employed. The degree of similarity of appearance of the moving object may be obtained, for example, in the following sequence. In the following description, a case where a person as the moving object is traced will be described by way of example.

First, the associating unit 212 calculates a feature value (feature vector) representing appearance of the moving object for each image. Note that the following calculation method is just for exemplary purposes, and any other feature value may also be employed.

The associating unit 212 generates a plurality of channel images by multi-channeling a portrait image (an area in which an image of a person appears in the image) using a plurality of color paces. A plurality of color spaces include color spaces resistant to a variation in the ambient light, such as a YCbCr color space, an HSV color space, and a Color-Names color space. The associating unit 212 performs multi-layer block fragmentation for fragmenting each channel image into blocks with a different number of fragments in the Y direction. The associating unit 212 calculates a histogram of values from each block and a histogram of binary codes based on a difference value with a neighboring pixel. The associating unit 212 extracts the feature value by normalizing and concatenating each calculated histogram. The associating unit 212 maps the extracted feature values on an identification space obtained in advance and obtains the feature value of the appearance of the moving object. The identification space is obtained through metrological learning in advance, for example, such that the same persons become closer, and other persons become farther.

A method of calculating the feature value will now be described in more details. Here, the associating unit 212 converts a portrait image obtained in three channels (RCP) into a plurality of color spaces to obtain multiple channels. For example, the portrait image is expanded to 17 channels including three channels of the YCbCr color space, three channels of the HSV color space, and 11 channels of the Color Names descriptor*. This expansion is to absorb a variation in the color information and the luminance information of the image caused by an individual difference of the camera 10, a change of the environment, and the like. It is known that this expansion reduces a variation of the color space caused by a change of the environment or the like (see J. Van, Learning color names for real-world applications, TIP, 18(7): 1512-1523, 2009).

Next, the associating unit 212 performs block fragmentation for each channel image (Ch image) into a plurality of layers. The associating unit 212 acquires histogram information from each block in the rear stage processing. In this case, if fragmentation is performed finely, influence caused by a positional deviation of a portrait rectangle becomes significant. However, since the positional information can be used, it is possible to improve recognizability. For this reason, the associating unit 212 performs wide-area fragmentation from fine fragmentation in a stepwise manner.

Figure 4:
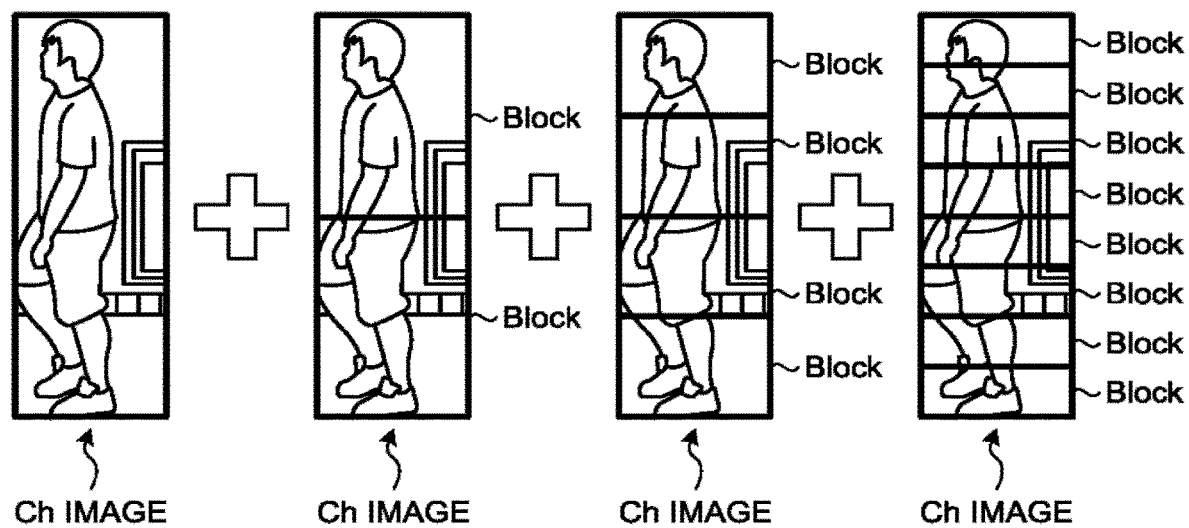
FIG. 4 is a diagram illustrating a concept of hierarchical fragmentation.

The fragmentation may be performed in both or any one of the y-axis direction and the x-axis direction. In the fragmentation process, a plurality of regions called "blocks" are defined from each channel image for each portrait image. FIG. 4 is a diagram illustrating a concept of hierarchical fragmentation. In FIG. 4, blocks are defined for each of the four channel images in a stepwise manner.

Next, the associating unit 212 extracts histogram information from each of the defined regions (blocks). For example, the associating unit 212 extracts the histogram information by normalizing and concatenating a histogram feature value representing frequency of each value in the region and a histogram feature value representing frequency of a difference value between each value in the region and a neighboring value (frequency in a gradient direction). As the latter feature value, for example, a feature value, called a "local binary pattern (LBP)", obtained by creating a histogram using binary codes allocated depending on values of a target pixel and a neighboring pixel may be employed.

Figure 5:
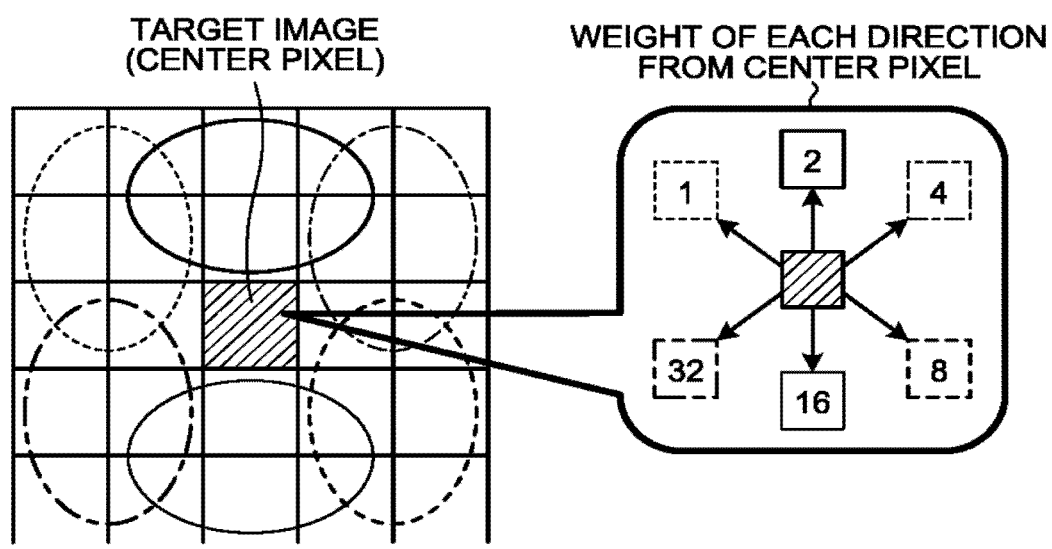
FIG. 5 is a diagram for describing a local binary pattern (LBP)
Figure 6:
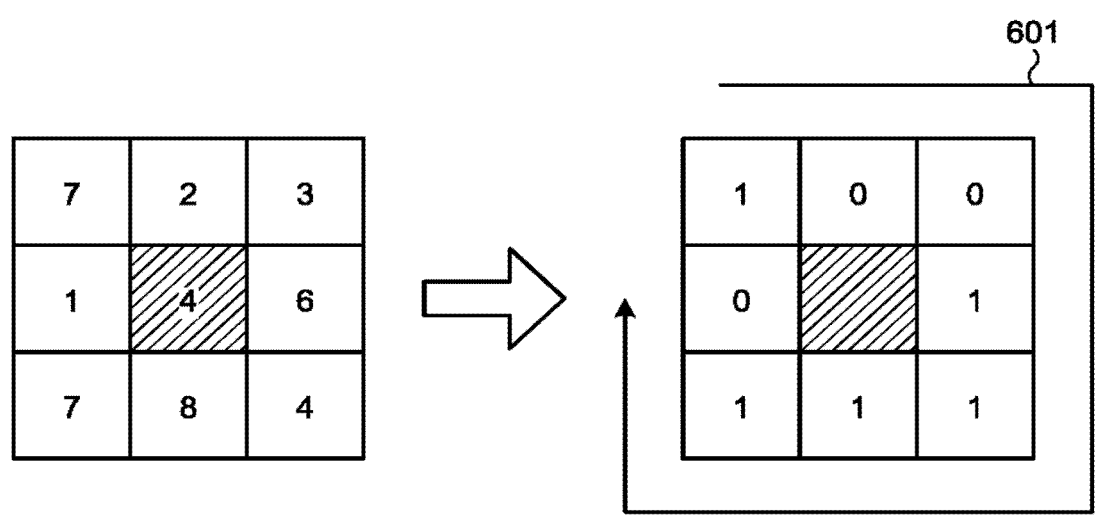
FIG. 6 is a diagram for describing the LBP.

FIGS. 5 and 6 are diagrams for describing the LBP. As illustrated in FIG. 5, binary codes are encoded by weighting a luminance value of the target pixel for each direction from the target pixel (center point) and an average luminance value of the pixel existing in this direction. For example, the luminance pattern illustrated in the left side of FIG. 6 is converted into a bit stream of binary codes arranged in the direction indicated by the arrow 601 of FIG. 6. In this example, when the luminance value of the neighboring pixel is lower than that of the center pixel, the luminance value of the neighboring pixel is converted into "0". When the luminance value of the neighboring pixel is higher than that of the center pixel, the luminance value of the neighboring pixel is converted into "1". The conversion method is not limited thereto (may be reversed). From each block (region), it is possible to obtain a dimensional feature value corresponding to a sum of the number of bins in the histogram of the value and the number of bins in the histogram of the LBP.

Next, the associating unit 212 normalizes and concatenates the feature value corresponding to a value obtained by multiplying the number of channels extracted from each block by the number of blocks and extracts a higher order feature vector. The associating unit 212 sets a feature vector (d-dimensional) obtained by converting a higher-order feature vector (D-dimensional) as a feature vector of each portrait image based on a conversion matrix obtained in advance through metrological learning in order to convert the same moving object in a close feature space and convert a different moving object in a far feature space.

While several techniques have been proposed in the metrological learning, they only calculate the conversion matrix having a fixed dimension (for example, the number of categories to be divided) in many cases. Meanwhile, for example, using REMetric*, it is possible to calculate a conversion matrix having an arbitrary dimension (see T. Kozakaya, Random Ensemble Metrics for Object Recognition, International Conference on Computer Vision (ICCV), 2011). A conversion matrix obtained by REMetric* may also be employed in the associating unit 212.

The associating unit 212 calculates the degree of similarity of appearance of the moving object using the feature value (feature vector) calculated in this manner. For example, the degree of similarity between each portrait image can be defined by a normalized cross-correlation between two feature vectors described above. Typically, since the tracking information has a plurality of portrait images, the degree of similarity between a plurality of images and a plurality of images can be defined. The associating unit 212 may define a maximum value of a plurality of degrees of similarity obtained for all of combinations of the feature vectors as the degree of similarity between tracking information, or may define an average value of a plurality of degrees of similarity as the degree of similarity between tracking information.

The method of calculating the degree of similarity is not limited thereto, hut any other method may also be employed. For example, a degree of similarity calculated in the following method may also be employed. First, the associating unit 212 performs a principal component analysis for a plurality of feature vector sequences obtained for each piece of tracking information to calculate a subspace. This subspace is a space expressing each moving object to visualize a variation of appearance. For this reason, the associating unit 212 calculates a degree of similarity between each subspace of tracking information using a mutual subspace method and sets it as the degree of similarity.

Using the aforementioned method, it is possible to obtain the degree of similarity between tracking information. The associating unit 212 calculates a mutual degree of similarity between tracking information obtained from all of the cameras 10. Here, when "N" pieces of tracking information are obtained, an N×N matrix having mutual degrees of similarity as elements is called a similarity matrix. The degree of similarity between the (i)th tracking information (where 1≤i≤N) and (j)th tracking information (where 1≤j≤N) is expressed as an element "S_i,j" of the similarity matrix. The similarity matrix is a symmetrical matrix, so that the elements "S_i,j" and the element "S_j,i" have the same values.

The degree similarity means similarity of appearance when an image is recognized as a moving object. The degree of similarity is calculated only based on individuality by excluding a part that changes depending on an environmental factor such as a viewing angle and a daily condition from feature extraction as much as possible. However, even when such a degree of similarity is employed, there are a set of cameras 10 in which the degree of similarity of the same person easily increases and a set of cameras 10 in which the degree of similarity easily decreases.

For this reason, the associating unit 212 independently calculates the similarity matrix using all sets of cameras 10. The associating unit 212 normalizes the degree of similarity for each of the obtained sets of the similarity matrices. A similarity table for all pieces of the tracking information can be created by connecting the similarity matrices between each camera 10.

Any method may be employed to normalize the degree of similarity. For example, z-score normalization may be employed representatively. In the z-score normalization, each element of the similarity matrix is a degree of similarity between other persons, and the degree of similarity of the same person is rare. Therefore, assuming that the element group of the similarity matrix has a normal distribution, a mean value and a standard deviation of this normal distribution are normalized to certain values.

Then, the associating unit 212 classifies the tracking information having a high degree of similarity into several clusters through a clustering process using the similarity matrix calculated for all sets of cameras 10. Any method may be employed as the clustering process. For example, the method described in JP 5174068 B2 may be employed in the clustering.

Here, the same moving object is associated by the tracking unit 111 for the images obtained in the same camera 10. For this reason, the associating unit 212 may cluster the degree of similarity between the tracking information obtained from the same camera 10 into zero by assuming that the tracking information obtained from the same camera 10 has no tracking information of the same moving object. As a result, it is possible to improve performance of the association.

In a typical clustering method, the N×N similarity matrix in which degrees of similarity between all pieces of tracking information as described above are described is necessary. Meanwhile, in the clustering method described in JP 5174068 B2, it is possible to execute calculation only using the degree of similarity between each piece of tracking information and a limited number of pieces of tracking information. For example, all of the "N" degrees of similarity are not necessary, but only "k" neighboring degrees of similarity (where k<H) and an index representing which tracking information are necessary. For this reason, "N×k" degrees of similarity and the index are used in the clustering process. In the clustering method of JP 5174068 B2, the amount of necessary information may be small, so that it is possible to perform processing with a small calculation load at a high speed.

Even in the clustering performed by adding the tracking information, the clustering process may be performed again by updating the degree of similarity and the index only when there is closer tracking information, compared to the information on the degree of similarity created in the aforementioned process.

In the clustering process described above, the associating unit 212 collectively executes the associating process, for three or more pieces of moving object information, in which a plurality of pieces of moving object information similar to each other are associated as the moving object information of the same moving object. For example, the tracking information classified into the same cluster corresponds to the racking information associated as the tracking information of the same moving object. As a result, it is possible to obtain an optimum association result as a whole.

Figure 7:
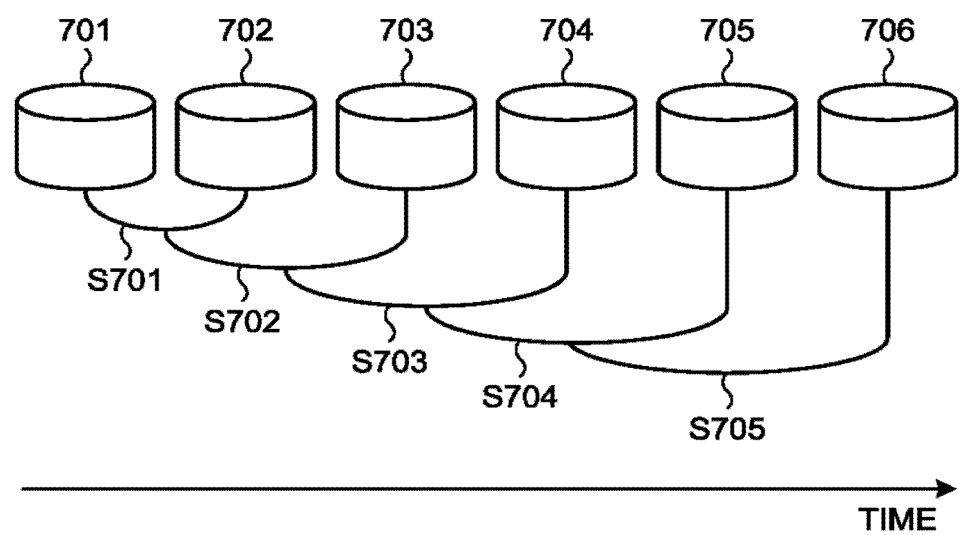
FIG. 7 is a conceptual diagram illustrating how to repeat association between a pair of cameras.

A concept of the associating process according to this embodiment will be further described with reference to FIGS. 7 to 9. FIG. 7 is a conceptual diagram illustrating a method of repeating the association between two cameras as in the related art.

The tracking information 701 to 706 of FIG. 7 represents tracking information obtained from each of different cameras. In the moving object tracking system using a plurality of security cameras, the pieces of tracking information 701, 702, 703, 704, 705, and 706 are sequentially obtained over time. Typically, similar tracking information is associated whenever the tracking information is obtained. For example, the initial tracking information 701 and the next tracking information 702 are associated with each other (step S701). In addition, if the tracking information 703 is obtained, the tracking information associated in step S701 and the tracking information 703 are associated with each other (step S702). Then, the same process is repeated (step S703 to step S705).

In this manner, as the number of cameras increases, it may be difficult to maintain its performance. In addition, since the result of association depends on the sequence of the association, it may be difficult to obtain an optimum association result as a whole in some cases.

Figure 8:
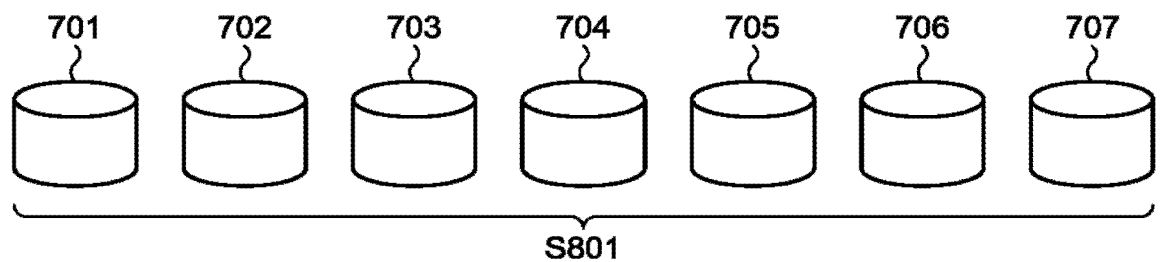
FIG. 8 is a conceptual diagram illustrating an associating process according to the first embodiment.

FIG. 8 is a conceptual diagram illustrating an associating process according to this embodiment. As illustrated in FIG. 8, according to this embodiment, the associating process is collectively executed when a plurality of pieces of tracking information 701 to 707 are obtained (step S801). Therefore, it is possible to obtain an optimum association result as a whole. According to this embodiment, the associating process is executed when three or more pieces of tracking information are obtained. Therefore, the timing of obtaining the association result is delayed, compared to the method of FIG. 7. The timing of the associating process according to this embodiment may be appropriately determined depending on the applied system, for example, such that a delay does not generate a problem.

Figure 9:
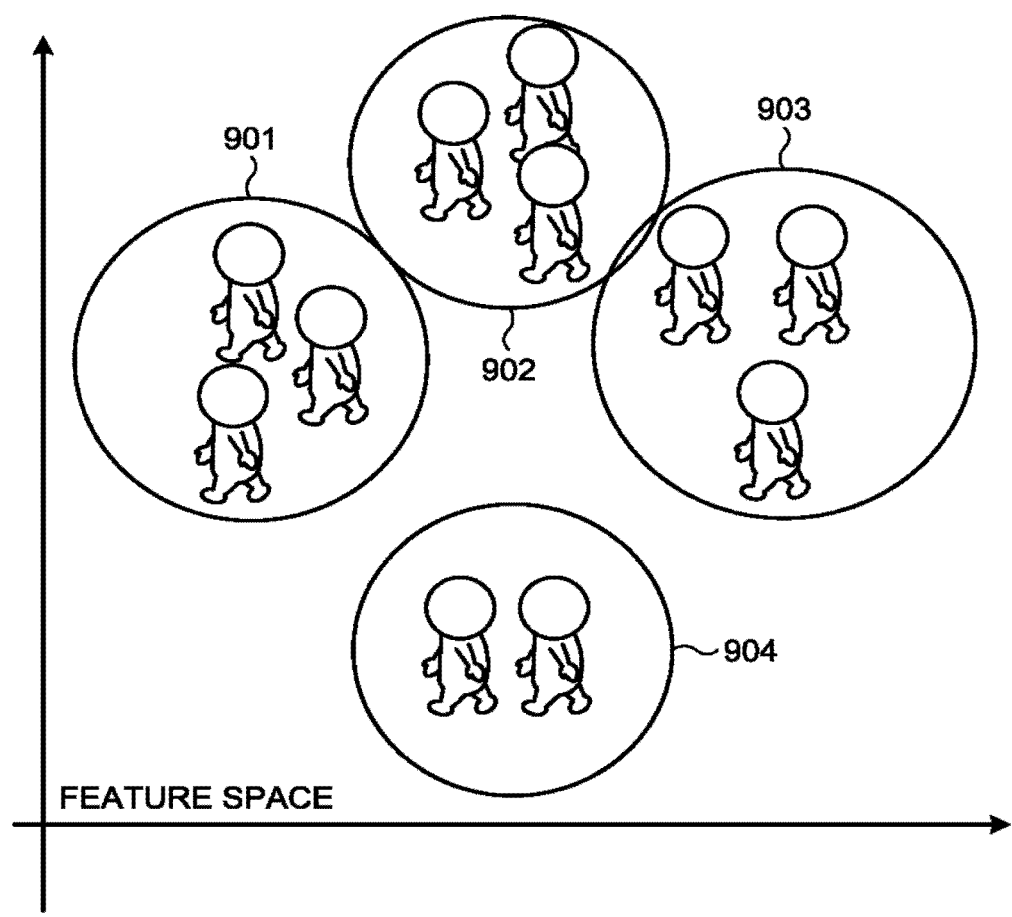
FIG. 9 is a conceptual diagram illustrating an exemplary clustering process.

FIG. 9 is a conceptual diagram illustrating an exemplary clustering process. FIG. 9 illustrates an example in which a person (tracking information) in a two-dimensional feature space is classified into four clusters 901 to 904. In the clustering process, a person (tracking information) is classified based on proximity in the feature space.

Returning to FIG. 3, the output control unit 213 outputs the moving object information (tracking information) associated by the associating unit 212. For example, the output control unit 213 allows the display unit 206 to display tracking information associated with a certain person out of the associated tracking information.

Figure 10:
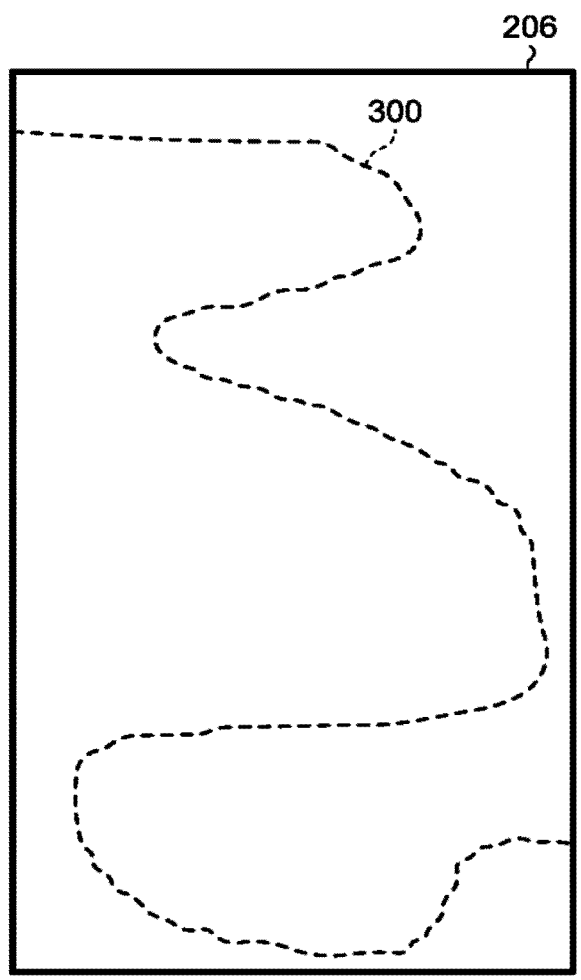
FIG. 10 is a diagram illustrating an example of displayed tracking information.
Figure 11:
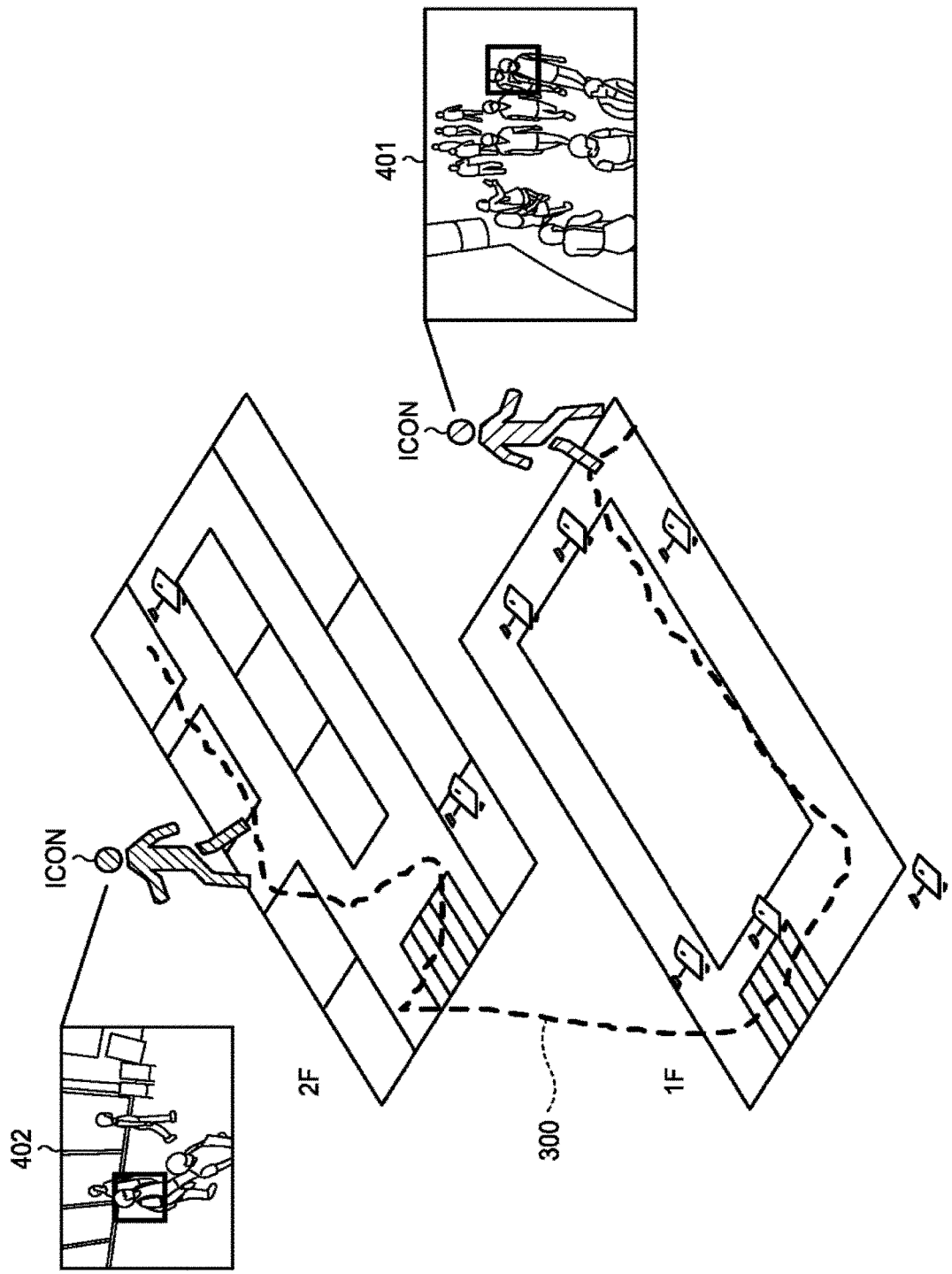
FIG. 11 is a diagram illustrating another example of the displayed tracking information.

FIG. 10 illustrates an example of the displayed tracking information. In the example of FIG. 10, a movement locus 300 obtained by associating the tracking information of a certain person is displayed. FIG. 11 is a diagram another example of the displayed tracking information. In the example of FIG. 11, an image 401 corresponding to latest time and an image 402 corresponding to past time are displayed along with the movement locus 300 in addition, in the example of FIG. 11, a pedestrian icon is also displayed in addition to the image.

Figure 12:
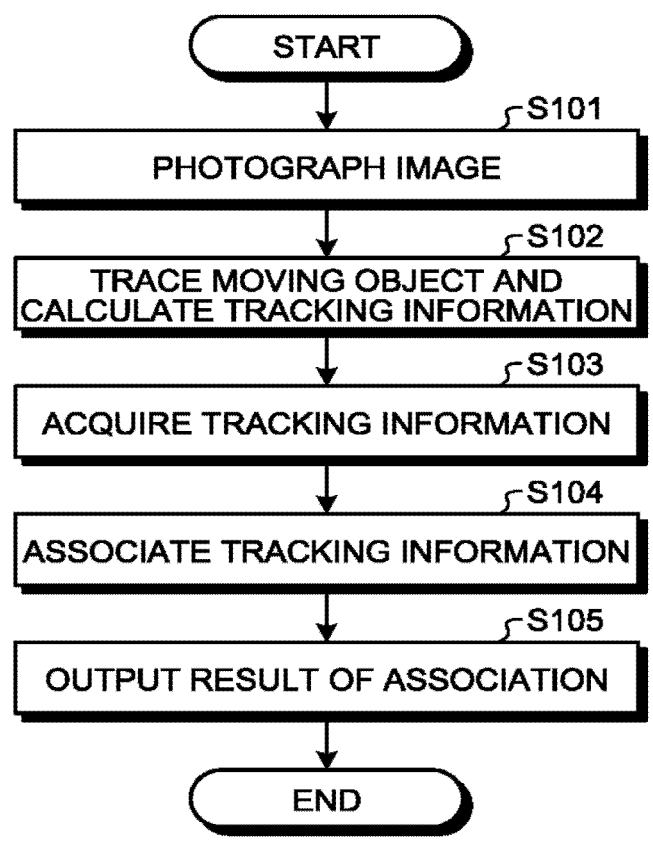
FIG. 12 is a flowchart illustrating a moving object tracking process according to the first embodiment.

Next, a moving object tracking process using the moving object tracking apparatus 20 having such a configuration according to the first embodiment will be described with reference to FIG. 12. FIG. 12 is a flowchart illustrating an exemplary moving object tracking process according to the first embodiment.

Each camera 10 photographs the image (step S101). The tracking unit 111 of the camera 10 traces a moving object using the photographed images and calculates the tracking information (step 2102). The tracking information is transmitted to the moving object tracking apparatus 20, for example, through the communication control unit 112.

The acquiring unit 211 of the moving object tracking apparatus 20 acquires tracking information from each camera 10 (step S103). The associating unit 212 executes the associating process for three or more pieces of tracking information obtained from three or more cameras 10 (step S104). The output control unit 213 outputs a result of the associating process (step S105).

In this manner, in the moving object tracking apparatus according to the first embodiment, association of the same moving object is executed in batch processing optimally as a whole using the information on the moving object obtained from each camera. As a result, it is possible to obtain, for example, information on the movement locus of the moving object with higher accuracy.

Second Embodiment

In a moving object tracking apparatus according to a second embodiment, each camera (tracking information acquired from each camera) is classified into any one of a plurality of groups. In addition, the tracking information is associated in each group, and the tracking information is further associated between groups. As a result, distributed processing can be performed.

Figure 13:
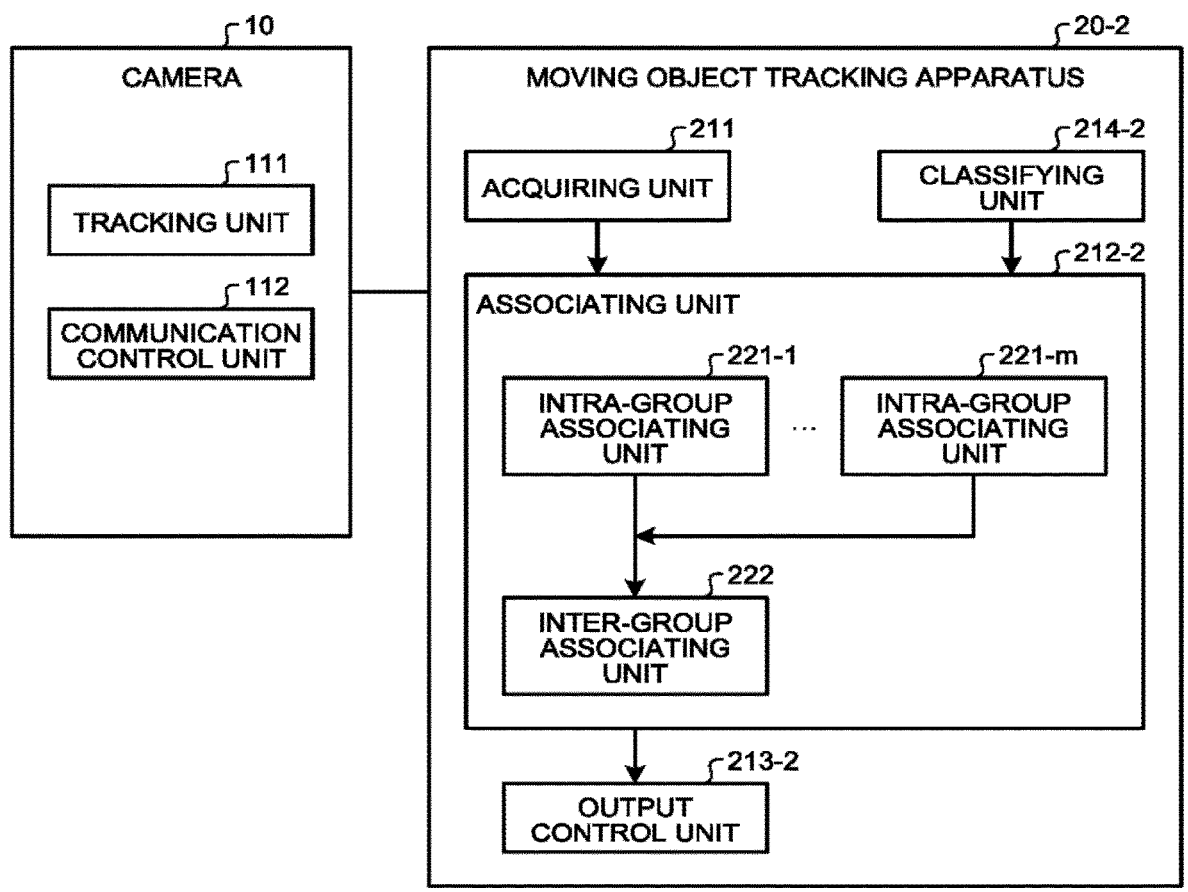
FIG. 13 is a block diagram illustrating a moving object tracking apparatus according to a second embodiment.

FIG. 13 is a block diagram illustrating an exemplary configuration of the moving object tracking apparatus 20-2 according to a second embodiment. As illustrated in FIG. 13, the moving object tracking apparatus 20-2 includes an acquiring unit 211, an associating unit 212-2, an output control unit 213-2, and a classifying unit 214-2.

The camera 10 is similar to that of the first embodiment. In addition, the moving object tracking apparatus 20-2 according to the second embodiment is different from that of the first embodiment in the functions of the associating unit 212-2 and the output control unit 213-2, and the classifying unit 214-2 added in the second embodiment. Other configurations and functions are similar to those illustrated in FIG. 3 which is a block diagram of the moving object tracking apparatus 20 of the first embodiment. Therefore, like reference numerals denote like elements, and they will not be described here repeatedly.

The classifying unit 214-2 classifies a plurality of cameras 10 into a plurality of groups. In addition, if the groups are defined in advance, the classifying unit 214-2 may be omitted. For example, the classifying unit 214-2 classifies a plurality of cameras 10 into a plurality of sets based on at least one of direct distances between a plurality of cameras 10 and a movement distance of a moving object on the path between cameras 10.

The classifying unit 214-2 may classify each camera 10 into a specified number of groups through a clustering process based on proximity of the distance. The number of groups to be classified may be settable by a user, for example, using the operation unit 205 or the like. Each camera 10 may belong to one or more groups.

A group classification method is not limited thereto, but any method may also be employed. For example, when a plurality of cameras 10 are installed in any of floors of a building, the cameras 10 may be classified on a floor basis. The cameras 10 to be classified may also be selected by a user.

Figure 14:
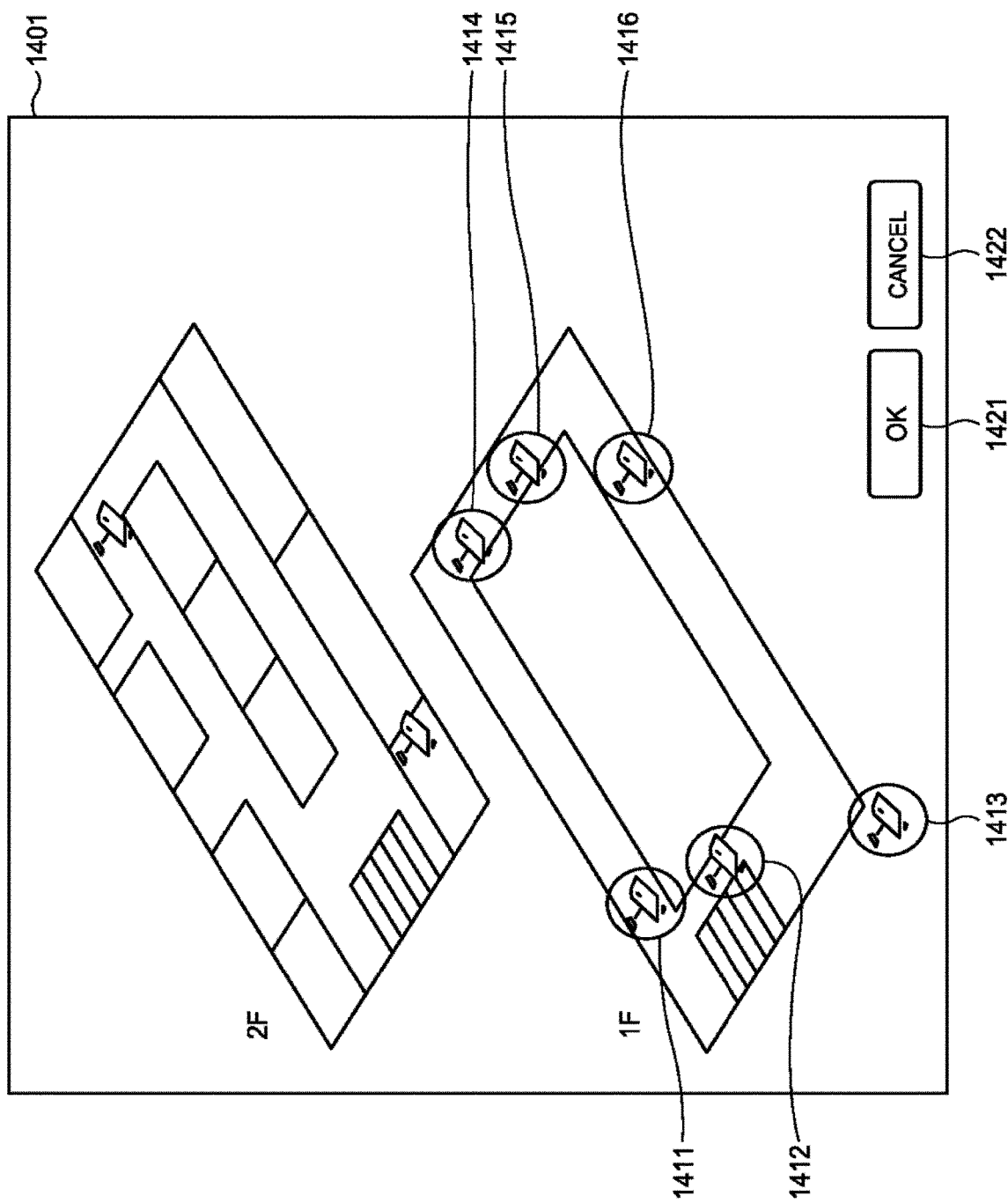
FIG. 14 is a diagram illustrating an exemplary selection screen for selecting cameras.

FIG. 14 is a diagram illustrating an example of the selection screen 1401 for selecting the cameras 10 to be classified by a user. The selection screen 1401 of FIG. 14 is an example in which the camera 10 is selectable on the same screen as that of FIG. 11 in which associated tracking information is displayed. The icons 1411 to 1416 are an icon representing a camera 10 selected as a camera 10 belonging to a certain group. If an OK button 1421 is pressed, the selected camera 10 is classified as a camera 10 belonging to the corresponding group. If a CANCEL button 1422 is pressed, the selection process is canceled.

In addition, each piece of tracking information is acquired from any of the cameras 10. Therefore, the groups for classifying the cameras 10 may also be considered as groups for classifying the tracking information. That each of a plurality of pieces of tracking information is classified into one or more groups to which a camera 10 used to photograph the image in which the tracking information is required.

Returning to FIG. 13, the associating unit 212-2 includes intra-group associating units 221-1 to 221-$m$ (where "m" denotes an integer equal to or greater than "2" and represents the number of groups) and an inter-group associating unit 222.

The intra-group associating units 221-1 to 221-$m$ execute the associating process for the tracking information included in the corresponding group. Since the intra-group associating units 221-1 to 221-$m$ have the same function, they may be simply referred to as an intra-group associating unit 221 when there is no need to distinguish. The intra-group associating unit 221 associates the tracking information using the same method as that of the associating unit 212 of the first embodiment.

In FIG. 13, the intra-group associating unit 221 is provided in each group. A single intra-group associating unit 221 may execute the associating process for a plurality of groups.

The inter-group associating unit 222 further executes the associating process for the tracking information associated by the intra-group associating unit 221. For example, the inter-group associating unit 222 collects the tracking information associated by the intra-group associating unit 221 from all of the groups and associates the tracking information using the same method as that of the associating unit 212 of the first embodiment.

The output control unit 213-2 further includes a function of outputting at least one of the moving object information associated within the group and the moving object information associated between the groups. For example, the output control unit 213-2 includes a function of switching between any one or both of outputs of the moving object information associated within a group and the moving object information associated between groups.

Figure 15:
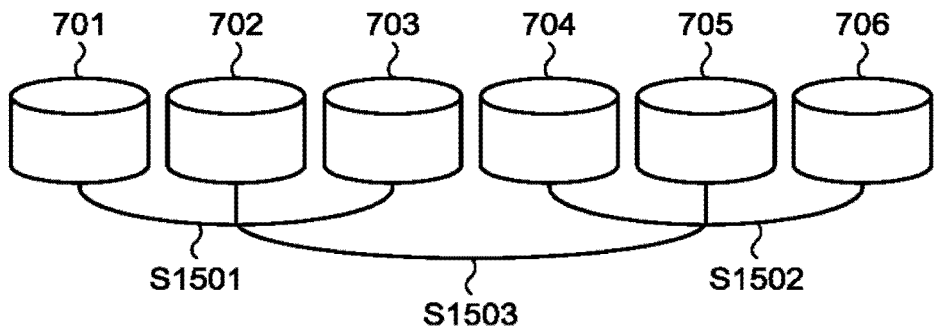
FIG. 15 is a conceptual diagram illustrating an associating process according to the second embodiment.

FIG. 15 is a conceptual diagram illustrating an associating process according to this embodiment. In the example of FIG. 15, pieces of the tracking information 701 to 703 belong to one group, and pieces of tracking information 704 to 706 belong to another group. If at least pieces of the tracking information 701 to 705 are obtained, the intra-group associating unit 221 corresponding to this group executes the associating process (step S1501). If pieces the tracking information 704 to 706 are obtained, the intra-group associating unit 221 corresponding to this group executes the associating process (step S1502). Then, the inter-group associating unit 222 further executes the associating process for the tracking information associated in steps S1501 and S1502 (step S1503).

Figure 16:
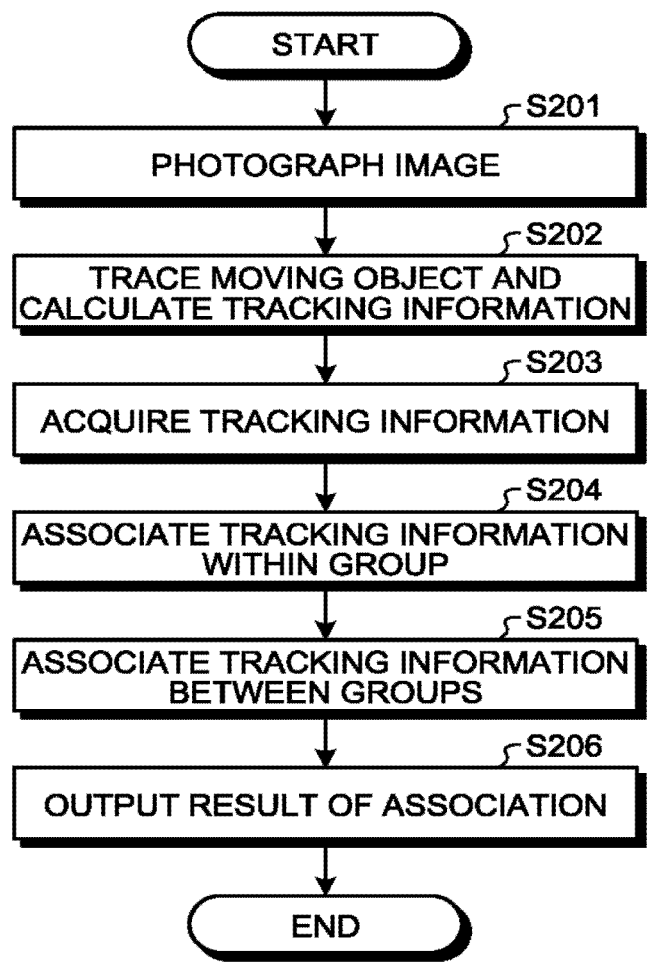
FIG. 16 is a flowchart illustrating a moving object tracking process according to the second embodiment.

Next, a moving object tracking process using a moving object tracking apparatus 20-2 having such a configuration according to a second embodiment will be described with reference to FIG. 16. FIG. 16 is a flowchart illustrating an exemplary moving object tracking process according to the second embodiment. Note that it is assumed that the process of classifying the cameras 10 has been completed before the moving object tracking process.

Steps S201 to S203 are similar to steps S101 to S103 of the moving object tracking apparatus 20 of the first embodiment, and they will not be described repeatedly.

The intra-group associating unit 221 executes the associating process for the tracking information belonging to the corresponding group (step S204). After the associating process is executed for two or more groups, the inter-group associating unit 222 executes an associating process for the tracking information between groups (step S205). The output control unit 213-2 outputs a result of the associating process (step S206).

The output control unit 213-2 may switch and output one or both of the racking information associated within a group or the tracking information associated between groups, for example, depending on selection by a user. For example, when a user selects display of the tracking information of one group, the output control unit 213-2 displays the tracking information obtained from the selected group on the display unit 206.

For example, it is assumed that a group to which a camera 10 installed in a first floor of a certain building belongs and a group to which a camera 10 installed in a second floor belongs are selected. When a user selects display of the tracking information obtained from a group corresponding to a certain floor (for example, first floor), the output control unit 213-2 displays the tracking information, for example, as illustrated in FIG. 10. When a user selects display of the tracking information obtained from a group corresponding to a plurality of floors (for example, first and second floors), the output control unit 213-2 displays the tracking information, for example, as illustrated in FIG. 11.

As described above, in the moving object tracking apparatus according to the second embodiment, the tracking information is associated within a plurality of groups obtained by classifying each camera, and then, the tracking information is further associated between groups. As a result, it is possible to perform distributed processing. Therefore, for example, it is possible to perform the processing at a high speed.

Third Embodiment

In each of the aforementioned embodiments, the associating process is executed based on the degree of similarity by using the tracking information obtained from a plurality of cameras as the moving object information. The method described above in each of the embodiments may also apply to when the tracking information is obtained from each camera. That is, according to the third embodiment, when the tracking information is obtained in each camera by tracing a moving object within photographed images, association to the same moving object is executed optimally as a whole through batch processing.

Figure 17:
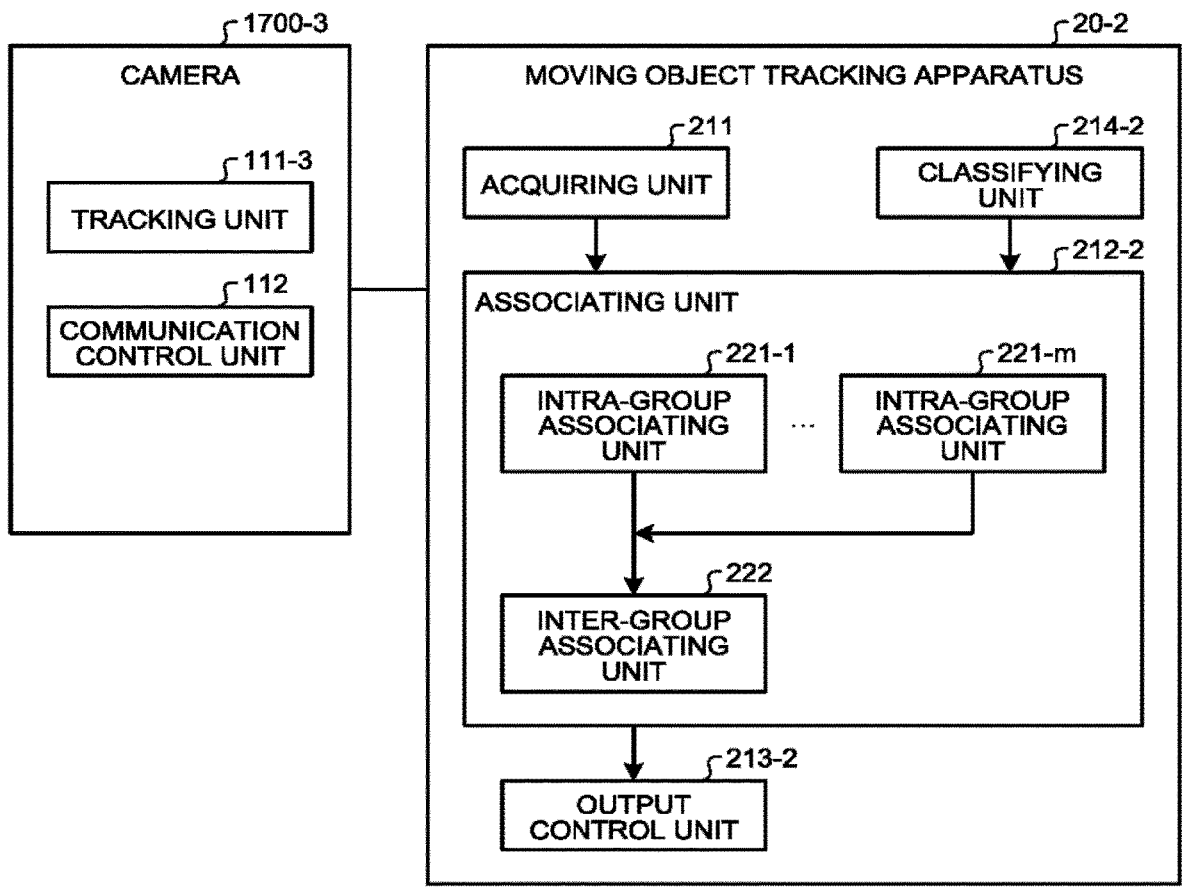
FIG. 17 is a functional block diagram illustrating an apparatus according to a third embodiment.

FIG. 17 is a block diagram illustrating an exemplary configuration of the camera 1700-3 and the moving object tracking apparatus 20-2 according to the third embodiment. The moving object tracking apparatus 20-2 is similar to that of the second embodiment. Therefore, like reference numerals denote like elements, and they will not be described repeatedly. In addition, the moving object tracking apparatus 20 of the first embodiment may be provided instead of the moving object tracking apparatus 20-2.

As illustrated in FIG. 17, the camera 1700-3 includes a tracking unit 111-3 and a communication control unit 112.

The camera 1700-3 according to the third embodiment is different from that of the first embodiment in the function of the tracking unit 111-3. Other configurations and functions are similar to those of FIG. 3 which is a block diagram of the camera 10 of the first embodiment. Therefore, like reference numerals denote like elements, and they will not be described repeatedly.

The tracking unit 111-3 obtains the tracking information by executing the associating process of the first or second embodiment by using information (detection information) on a moving object detected from the photographed images instead of the tracking information. The detection information is, for example, information representing a partial image obtained by cutting a bounding rectangle of the moving object detected from images of a single frame.

The tracking unit 111-3 has the same function as that of the moving object tracking apparatus 20 of the first embodiment (including the acquiring unit 211, the associating unit 212, and the output control unit 213) or the moving object tracking apparatus 20-2 of the second embodiment (including the acquiring unit 211, the associating unit 212-2, the output control unit 213-2, and the classifying unit 214-2). According to this embodiment, the camera 1700-3 or the tracking unit 111-3 may also be considered as the moving object tracking apparatus.

For example, the tracking unit 111-3 acquires a plurality of pieces of moving object information (detection information) representing the moving object included in the photographed image (function of the acquiring unit 211). The tracking unit 111-3 collectively executes the associating process for associating the moving object information (detection information) for three or more pieces of detection information (function of the associating unit 212 or 212-2). The tracking unit 111-3 outputs the associated detection information (corresponding to the tracking information) (function of the output control unit 213 or 213-2).

In this manner, according to this embodiment, the detection information corresponds to the moving object information representing a moving object included in an image. A plurality of pieces of detection information detected by the tracking unit 111-3 include detection information (first moving object information) representing a moving object detected from a certain image (first image) and detection information (second moving object information) representing a moving object detected from the other image (second image) out of a plurality of images photographed by the camera 1700-3.

Figure 18:
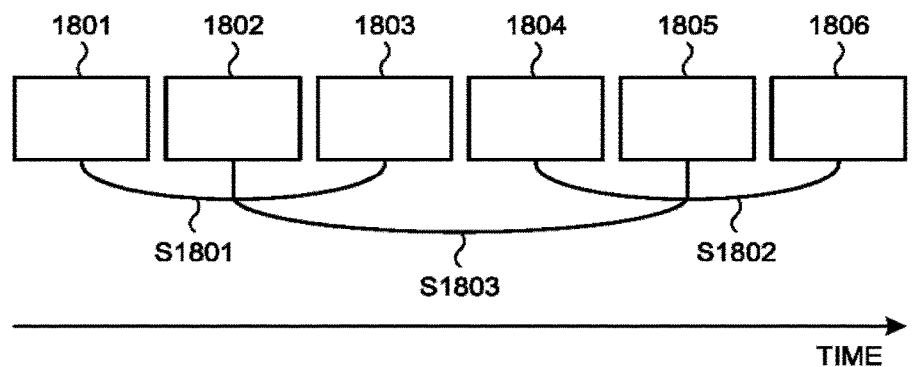
FIG. 18 is a conceptual diagram illustrating an associating process according to the third embodiment.

FIG. 18 is a conceptual diagram illustrating an associating process according to this embodiment. FIG. 18 illustrates an example in which the method of the second embodiment is applied to the tracking unit 111-3. As illustrated in FIG. 18, according to this embodiment, for example, the detection information 1801 to 1806 obtained from images of a single frame is associated in the associating process. In the example of FIG. 18, the detection information 1801 to 1603 belongs to one group, and the detection information 1804 to 1806 belongs to the other group.

If at least pieces of the detection information 1801 to 1803 are obtained, the associating process is executed for the detection information belonging to this group (step S1801). If pieces of the detection information 1804 to 1806 are obtained, the associating process is executed for the detection information belonging to this group (step S1802). Then, the associating process is further executed for the detection information associated in steps S1801 and S1802 (step S1803).

In this manner, according to the third embodiment, the same method as that of the first or second embodiment may be applied when the tracking information is obtained in each camera.

As described above, according to the first to third embodiments, it is possible to obtain the moving object information with higher accuracy.

The programs executed by the apparatuses (including camera and the moving object tracking apparatus) according to the first to third embodiments are installed in a ROM or the like in advance.

The programs executed by the apparatuses according to the first to third embodiments may be provided as a computer program product by recording a file having an installable format or an executable format in a computer readable recording medium such as a compact disk read only memory (CD-ROM), a flexible disk (FD), a compact disk recordable (CD-R), and a digital versatile disk (DVD).

The programs executed by the apparatuses according to the first to third embodiments may be stored in a computer connected to a network such as the Internet and be downloaded via the network. In addition, the programs executed by the apparatuses according to the first to third embodiments may be provided or distributed via a network such as the Internet.

In the programs executed by the apparatuses according to the first to third embodiments, a computer may serve as each unit of the aforementioned apparatuses. This computer may execute the program by allowing a CPU to read and execute the program from a computer readable storage medium to a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A moving object tracking apparatus comprising:
one or more processors configured to:
acquire a plurality of pieces of moving object information representing a moving object included in a photographed image;
execute an associating process for associating a plurality of pieces of the moving object information similar to each other as the moving object information of the same moving object for three or more pieces of the moving object information; and
output the associated moving object information, wherein
each of the plurality of pieces of moving object information is acquired based on the photographed image that is photographed by one of a plurality of imaging units,
each of the plurality of imaging units is classified into one of a plurality of groups,
each of the plurality of groups includes two or more of the plurality of imaging units,
each of the plurality of pieces of moving object information is classified into one of the plurality of groups to which a first imaging unit belongs, the first imaging unit photographing the corresponding photographed image, and
the associating process includes:
an intra-group associating process for the moving object information included in the group, and
an inter-group associating process for the moving object information associated by the intra-group associating process.

2. The apparatus according to claim 1, wherein the one or more processors is further configured to:
classify the plurality of imaging units into a plurality of the groups based on at least one of a direct distance between the imaging units and a movement distance of the moving object on a path between the imaging units.

3. The apparatus according to claim 1, wherein
the one or more processors output at least one of the moving object information associated within the group and the moving object information associated between the groups.

4. A moving object tracking apparatus comprising:
one or more processors configured to:
acquire a plurality of pieces of tracking information representing information obtained by tracing a moving object included in a plurality of images from a plurality of selected imaging units;
execute an associating process for associating a plurality of pieces of the tracking information similar to each other as the tracking information of the same moving object for three or more pieces of the tracking information; and
output the associated tracking information, wherein
each of the plurality of pieces of tracking information is acquired based on the photographed image that is photographed by one of a plurality of imaging units,
each of the plurality of imaging units is classified into one of a plurality of groups,
each of the plurality of groups includes two or more of the plurality of imaging units,
each of the plurality of pieces of tracking information is classified into one of the plurality of groups to which a first imaging unit belongs, the first imaging unit photographing the corresponding photographed image, and
the associating process includes:
an intra-group associating process for the tracking information included in the group, and
an inter-group associating process for the tracking information associated by the intra-group associating process.

5. A moving object tracking method comprising:
acquiring a plurality of pieces of moving object information representing a moving object included in a photographed image;
executing an associating process for associating a plurality of pieces of the moving object information similar to each other as the moving object information of the same moving object for three or more pieces of the moving object information; and
outputting the associated moving object information, wherein
each of the plurality of pieces of moving object information is acquired based on the photographed image that is photographed by one of a plurality of imaging units,
each of the plurality of imaging units is classified into one of a plurality of groups,
each of the plurality of groups includes two or more of the plurality of imaging units,
each of the plurality of pieces of moving object information is classified into one of the plurality of groups to which a first imaging unit belongs, the first imaging unit photographing the corresponding photographed image, and
the associating process includes:
  an intra-group associating process for the moving object information included in the group, and
  an inter-group associating process for the moving object information associated by the intra-group associating process.

6. A computer program product having a non-transitory computer readable medium including programmed instructions, the instructions causing a computer to execute:
acquiring a plurality of pieces of moving object information representing a moving object included in a photographed image;
executing an associating process for associating a plurality of pieces of the moving object information similar to each other as the moving object information of the same moving object for three or more pieces of the moving object information; and
outputting the associated moving object information, wherein
each of the plurality of pieces of moving object information is acquired based on the photographed image that is photographed by one of a plurality of imaging units,
each of the plurality of imaging units is classified into one of a plurality of groups,
each of the plurality of groups includes two or more of the plurality of imaging units,
each of the plurality of pieces of moving object information is classified into one of the plurality of groups to which a first imaging unit belongs, the first imaging unit photographing the corresponding photographed image, and
the associating process includes:
  an intra-group associating process for the moving object information included in the group, and
  an inter-group associating process for the moving object information associated by the intra-group associating process.

* * * * *